(12) United States Patent
Kluge

(10) Patent No.: US 11,035,441 B2
(45) Date of Patent: Jun. 15, 2021

(54) 6-SPEED PLANETARY TRANSMISSION

(71) Applicant: Bayerische Motoren Werke Aktiengesellschaft, Munich (DE)

(72) Inventor: Benjamin Kluge, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 153 days.

(21) Appl. No.: 16/369,011

(22) Filed: Mar. 29, 2019

(65) Prior Publication Data
US 2019/0226558 A1 Jul. 25, 2019

Related U.S. Application Data

(63) Continuation of application No. PCT/EP2017/079828, filed on Nov. 21, 2017.

(30) Foreign Application Priority Data

Dec. 8, 2016 (DE) ..................... 10 2016 224 461.2

(51) Int. Cl.
*F16H 3/66* (2006.01)
*F16H 3/72* (2006.01)
(Continued)

(52) U.S. Cl.
CPC ............. *F16H 3/728* (2013.01); *B60K 6/365* (2013.01); *B60K 6/387* (2013.01); *B60K 6/547* (2013.01);
(Continued)

(58) Field of Classification Search
CPC ..... F16H 2200/2041; F16H 2200/0052; F16H 2200/201; F16H 2200/2043; F16H 2057/0075; F16H 2200/2012
See application file for complete search history.

(56) References Cited

U.S. PATENT DOCUMENTS 3,812,739 A * 5/1974 Mori ........................ F16H 3/66
 475/285
3,971,267 A * 7/1976 Murakami .............. F16H 3/666
 475/276
(Continued)

FOREIGN PATENT DOCUMENTS

DE 24 47 581 A 4/1976
DE 40 28 152 A1 3/1991
(Continued)

OTHER PUBLICATIONS

"Das Neungang-Automatikgetriebe 9G-Tronic Von Mercedes-Benz", Entwicklung Getriebe, Jan. 31, 2014, pp. 40-45, XP055175590 (six (6) pages).
(Continued)

*Primary Examiner* — Sherry L Estremsky
(74) *Attorney, Agent, or Firm* — Crowell & Moring LLP

(57) ABSTRACT

A 6-speed planetary transmission for a motor vehicle has an input shaft, an output shaft, a first planetary gear set, a second planetary gear set and a third planetary gear set. The input shaft can be coupled to the first planetary carrier or to the first ring gear via a first shifting element. The first sun gear can be coupled to a gearbox housing via a second shifting element. The first planetary carrier can be coupled to the first ring gear via a third shifting element. The second ring gear or the second planetary carrier can be coupled to the gearbox housing via a fourth shifting element. In addition, the first ring gear or the first planetary carrier, the second sun gear and the third sun gear are connected for conjoint rotation. In addition, the output shaft is connected for conjoint rotation to the second planetary carrier or the second ring gear.

9 Claims, 4 Drawing Sheets

(51) Int. Cl.
*B60K 6/365* (2007.10)
*B60K 6/547* (2007.10)
*F16H 3/78* (2006.01)
*B60K 6/387* (2007.10)
B60K 6/48 (2007.10)
B60K 6/54 (2007.10)
B60K 6/38 (2007.10)
F16H 3/44 (2006.01)

(52) U.S. Cl.
CPC ............... *F16H 3/66* (2013.01); *F16H 3/666* (2013.01); *F16H 3/725* (2013.01); *F16H 3/78* (2013.01); *B60K 2006/381* (2013.01); *B60K 2006/4808* (2013.01); *B60K 2006/4816* (2013.01); *B60K 2006/4825* (2013.01); *B60K 2006/541* (2013.01); *F16H 2003/445* (2013.01); *F16H 2200/0052* (2013.01); *F16H 2200/201* (2013.01); *F16H 2200/2041* (2013.01); *F16H 2200/2043* (2013.01); *F16H 2200/2046* (2013.01); *F16H 2200/2048* (2013.01); *F16H 2200/2064* (2013.01); *F16H 2200/2094* (2013.01); *Y02T 10/62* (2013.01)

(56) References Cited

U.S. PATENT DOCUMENTS

| | | | | |
|---|---|---|---|---|
| 4,046,031 | A * | 9/1977 | Ott | F16H 3/66 475/280 |
| 6,589,129 | B2 * | 7/2003 | Usoro | F16H 3/66 475/275 |
| 6,705,967 | B2 * | 3/2004 | Raghavan | F16H 3/66 475/275 |
| 6,780,138 | B2 * | 8/2004 | Raghavan | F16H 3/66 475/276 |
| 7,261,661 | B2 * | 8/2007 | Schmidt | B60K 6/48 475/5 |
| 7,291,085 | B2 * | 11/2007 | Park | F16H 3/66 475/280 |
| 7,566,284 | B2 * | 7/2009 | Gumpoltsberger | F16H 3/66 475/276 |
| 7,699,735 | B2 * | 4/2010 | Conlon | B60K 6/48 475/5 |
| 8,425,370 | B2 * | 4/2013 | Leesch | F16H 3/66 475/276 |
| 9,175,747 | B2 * | 11/2015 | Lippert | F16H 3/66 |
| 9,182,013 | B2 * | 11/2015 | Gumpoltsberger | F16H 3/44 |
| 2007/0021258 | A1 | 1/2007 | Conlon | |
| 2008/0009385 | A1 | 1/2008 | Kamm et al. | |
| 2010/0130323 | A1 | 5/2010 | Gumpoltsberger | |
| 2011/0251014 | A1 | 10/2011 | Leesch et al. | |

FOREIGN PATENT DOCUMENTS

| | | | | |
|---|---|---|---|---|
| DE | 10 2006 028 789 A1 | 4/2008 | | |
| DE | 10 2007 022 776 A1 | 12/2008 | | |
| DE | 10 2009 025 609 A1 | 12/2010 | | |
| DE | 10 2010 035 209 A1 | 3/2012 | | |
| DE | 10 2014 218 625 A1 | 3/2016 | | |
| DE | 102015205164 A1 * | 9/2016 | ............ | F16H 61/22 |
| DE | 10 2015 213 066 A1 | 1/2017 | | |
| DE | 102016224458 A1 * | 6/2018 | ............... | B60K 6/52 |
| DE | 102018130784 A1 * | 6/2020 | ............ | B60K 6/547 |
| EP | 1 236 930 A2 | 9/2002 | | |
| JP | 2-107848 A | 4/1990 | | |
| WO | WO 2010/060500 A1 | 6/2010 | | |

OTHER PUBLICATIONS

International Search Report (PCT/ISA/210) issued in PCT Application No. PCT/EP2017/079828 dated Mar. 2, 2018 with English translation (seven pages).

German-language Written Opinion (PCT/ISA/237) issued in PCT Application No. PCT/EP2017/079828 dated Mar. 2, 2018 (11 pages).

German-language Search Report issued in counterpart German Application No. 10 2016 224 461.2 dated Aug. 9, 2017 with partial English translation (12 pages).

Cover page of EP 2 342 477 A1 published Jul. 13, 2011 (one page).

Belz, "Varianten von Mehrgang-Planetengetrieben", Mar. 8, 2016, XP055257458, https://register.epo.om/application?documentId=EYPWMGE87270DSU&appnumber=EP13756488&showPdfPage=all (19 pages).

* cited by examiner

| | 52 | 56 | 50 | 54 | 58/60/61 |
|---|---|---|---|---|---|
| A | | X | X | X | |
| B | X | X | X | | |
| C | | X | X | | X |
| D | X | | X | | X |
| E | | | X | X | X |
| F | X | | | X | X |

6-SPEED PLANETARY TRANSMISSION

CROSS REFERENCE TO RELATED APPLICATIONS

This application is a continuation of PCT International Application No. PCT/EP2017/079828, filed Nov. 21, 2017, which claims priority under 35 U.S.C. § 119 from German Patent Application No. 10 2016 224 461.2, filed Dec. 8, 2016, the entire disclosures of which are herein expressly incorporated by reference.

BACKGROUND AND SUMMARY OF THE INVENTION

The invention relates to a 6-speed planetary transmission for a motor vehicle.

Planetary transmissions are usually used in transmissions for motor vehicles, which transmissions can be shifted in an automated manner. Here, the number of gears which can be shifted via the planetary transmission has risen in the last years. For example, transmissions which can be shifted in an automated manner with up to nine gears are available nowadays.

One example of a planetary transmission with nine gears can be gathered from DE 10 2009 025 609 A1.

One or more electric motors is/are frequently additionally integrated into planetary transmissions of this type. This is then called a hybridization of the transmissions. The associated motor vehicle can then be driven by an internal combustion engine alone, by the electric motor alone or in a combined manner by the internal combustion engine and by the electric motor. In the last-mentioned case, the planetary transmission acts as what is known as a summing transmission and combines the torque which is generated by the internal combustion engine and by the electric motor.

It is the object of the invention to provide an improved planetary transmission for a motor vehicle. In particular, the planetary transmission is to require merely a small amount of installation space, with the result that the integration of electric motors is possible in a simple manner. The planetary transmission to be provided is therefore to be capable of being hybridized in a simple manner.

This and other objects are achieved by way of a 6-speed planetary transmission of the type mentioned at the outset, having a transmission input shaft, a transmission output shaft, a first planetary gear set which comprises a first sun gear, a first planetary carrier, a first internal gear and at least one first planetary gear, a second planetary gear set which comprises a second sun gear, a second planetary carrier, a second internal gear and at least one second planetary gear, and a third planetary gear set which comprises a third sun gear, a third planetary carrier, a third internal gear and at least one third planetary gear. The transmission input shaft is coupleable via a first shifting element to the first planetary carrier or the first internal gear. The first sun gear is coupleable via a second shifting element to a transmission housing. The first planetary carrier is coupleable via a third shifting element to the first internal gear. The first internal gear or the first planetary carrier, the second sun gear and the third sun gear are connected fixedly so as to rotate together. The second internal gear or the first planetary carrier are coupleable via a fourth shifting element to the transmission housing, and the transmission output shaft is connected fixedly to the second planetary carrier or the second internal gear so as to rotate with it. The second sun gear and the third sun gear therefore form what is known as a double sun.

The shifting elements are to be understood to mean clutch elements and/or brake elements, by way of which rotationally fixed coupling and corresponding decoupling of the relevant transmission components are possible. In the case of the shifting elements, they are usually called clutches if two rotatable components are coupled or decoupled. For the case where a rotatable component is coupled to or decoupled from a stationary component, they are called brakes. Here, all the shifting elements can be replaced by identically acting ones. In particular, the third shifting element can be replaced by a shifting element which acts between the first sun gear and the first internal gear or between the first sun gear and the first planetary carrier. The 6-speed planetary transmission comprises three planetary gear sets. In comparison with known planetary transmissions which comprise, for example, four planetary gear sets, it is therefore of very compact construction. Therefore, the 6-speed planetary transmission has sufficient installation space, in order to integrate one or more electric motors and therefore to hybridize the transmission.

The invention is based on the concept that, in hybridized transmissions, the electric motors can take over gear tasks and/or functions. In this way, the mechanical transmission structure can be simplified. In particular, said concept is based on the finding that the fine gradation of the mechanical (component) transmission which is customary in the case of purely mechanical transmissions is not necessary in hybridized transmissions, since the electric motors can also be used for the transmission ratio adjustment. It is therefore sufficient to provide fewer gear stages in comparison with purely mechanical transmissions. As a result, the mechanical transmission can be realized with fewer components. As a consequence, more installation space is available for the integration of the electric motor or motors. The electric motors can maintain the tractive power, for example, during a shifting operation and/or can be used for synchronizing elements of the mechanical (component) transmission. All or some frictionally locking shifting elements can then be replaced by positively locking shifting elements. This is advantageous with regard to installation space and degree of efficiency.

In accordance with one embodiment, the transmission input shaft is connected fixedly to the third planetary carrier so as to rotate with it. The transmission is therefore of simple construction.

Here, the transmission output shaft can be capable of being coupled via a fifth shifting element to the third internal gear. Here, the designation of the shifting element as "fifth" is selected exclusively for the clear description of the 6-speed planetary transmission. In particular, said designation is not an indication of a number of shifting elements which are installed in the 6-speed planetary transmission. Therefore, all six gears can be shifted.

In one variant, the first planetary gear set comprises an outer first planetary gear and an inner first planetary gear, the outer first planetary gear interacting with the first internal gear, the inner first planetary gear interacting with the first sun gear, and the first outer planetary gear interacting with the first inner planetary gear. A 6-speed planetary transmission of compact construction which can be hybridized in a simple manner is therefore provided.

One design variant provides that the second planetary gear set comprises an outer second planetary gear and an inner second planetary gear, the outer second planetary gear interacting with the second internal gear, the inner second planetary gear interacting with the second sun gear, and the outer second planetary gear interacting with the inner second planetary gear. In this configuration, the 6-speed planetary transmission requires only a small amount of installation space. As a result, electric motors can be arranged in the transmission in a comparatively simple manner.

In one alternative, the transmission output shaft is connected fixedly to the third internal gear so as to rotate with it. The 6-speed planetary transmission therefore functions reliably and is of simple construction.

The transmission input shaft can additionally be capable of being coupled via a sixth shifting element to the third planetary carrier. If the sixth shifting element is used instead of the fifth shifting element, an alternative 6-speed planetary transmission is produced.

In one variant, the transmission input shaft is connected fixedly to the third internal gear so as to rotate with it. The 6-speed planetary transmission is therefore of simple construction.

In addition, the third planetary carrier can be capable of being coupled via a seventh shifting element to the transmission output shaft. Therefore, all six gears can be shifted. The 6-speed planetary transmission thus has a compact construction.

One development provides that the third planetary gear set comprises an outer third planetary gear and an inner third planetary gear, the outer third planetary gear interacting with the third internal gear, the inner third planetary gear interacting with the third sun gear, and the outer third planetary gear interacting with the inner third planetary gear. The 6-speed planetary transmission thus takes up only a small amount of installation space. The integration of electric motors (what is known as the hybridization) is simple.

At least one of the shifting elements is advantageously a positively locking shifting element, and all the shifting elements are preferably positively locking shifting elements. These are as a rule of more compact design than frictionally locking shifting elements. Therefore, the 6-speed planetary transmission requires only a small amount of installation space. Moreover, positively locking shifting elements usually operate without slip. They therefore have a high degree of efficiency, with the result that the degree of efficiency of the 6-speed planetary transmission is also high.

A first electric motor is advantageously coupled to the first sun gear. The 6-speed planetary transmission is therefore hybridized. As mentioned above, the electric motor can take over gear tasks, for example transmission ratio adjustment, synchronization, tractive power maintenance. Therefore, functions can be carried out by way of the 6-speed planetary transmission which comprises merely three planetary gear sets, which functions can otherwise be realized only by way of larger and more complex planetary transmissions, for example by those with four planetary gear sets.

Moreover, a second electric motor can be coupled to the transmission input shaft, the transmission output shaft or the third internal gear. This results in the same advantages which have already been described with regard to the first electric motor. For the case where the second electric motor is attached to the third internal gear, the 6-speed planetary transmission is preferably utilized as a transverse transmission. Instead of coupling the second electric motor to the transmission output shaft, said second electric motor can also be coupled to any desired vehicle output shaft, for example the front or rear axle. The gear function is not changed as a result.

In one embodiment, a third electric motor is coupled to the second sun. Here, the number of electric motors cannot be concluded from the designation "third". For example, only a single electric motor can be used in total, which electric motor is called "third" within the context of a clear description, however. This results in the advantages which have already been described with regard to the first electric motor. A 6-speed planetary transmission of this type is preferably used as a transverse transmission.

One design variant additionally provides that a fourth electric motor is coupled to the third internal gear. Reference is made to the description of the advantages with regard to the remaining electric motors. The transmission is then preferably utilized as a transverse transmission.

Here, a reverse gear can be realized by means of one or more of the electric motors. Therefore, a mechanical transmission structure can be used, by means of which no reverse gear can be realized. Therefore, the 6-speed planetary transmission can be of comparatively simple configuration. As a result, the installation space which is required for the planetary transmission can be reduced.

Furthermore, one or more of the electric motors can act as synchronizing elements. Elements of the 6-speed planetary transmission can therefore be synchronized, in particular can be shifted in a synchronized manner. In this way, it becomes possible to use positively locking shifting elements and to shift them in a synchronized manner. The advantages of positively locking shifting elements have already been described. In addition, a gear change without an interruption of the tractive power becomes possible.

The 6-speed planetary transmission is constructed from negative and/or positive planetary gear sets. The planetary transmission is preferably constructed exclusively from negative planetary gear sets. Here, a negative planetary gear set can be converted into a positive planetary gear set by the attachment of the planetary carrier and the internal gear being swapped. If the stationary transmission ratio is additionally adapted, a 6-speed planetary transmission with the same action can be realized by way of positive planetary gear sets.

The 6-speed planetary transmission can be a transmission which can be shifted in an automated manner. The shifting elements are therefore opened and closed in an automated manner depending on a drive situation, in particular depending on a speed and a load, without it being necessary for a driver to trigger the shifting operation. It goes without saying that, in addition or as an alternative, a manual gear change can be provided, in the case of which a driver initiates the gear change, for example, by way of the touch of a button or a selector lever and the shifting elements are thereupon actuated automatically. If a plurality of shifting elements have to have their shifting state changed for a gear change, this takes place in a coordinated manner.

In accordance with one development of the invention, the 6-speed planetary transmission is derived by way of the removal of one planetary gear set from a planetary transmission having four planetary gear sets. The 6-speed planetary transmission is therefore not developed as a transmission with three planetary gear sets. Instead, one planetary gear set is removed in a targeted manner from a planetary transmission with four planetary gear sets. The 6-speed planetary transmission is therefore developed with low expenditure. The planetary transmission with four planetary gear sets can be, for example, a 9-gear planetary transmission. A transmission of this type is known, in particular, from DE 10 2009 025 609 A1.

Here, a method for deriving a planetary transmission with a first number of planetary gear sets, for example three, from a planetary transmission with a second number of planetary gear sets, for example four, the second number being greater than the first number, can comprise the following step:

removal of one planetary gear set or a plurality of planetary gear sets from the planetary transmission with the second number of planetary gear sets. Here, that planetary gear set or those planetary gear sets is/are preferably removed which is/are utilized for as few gears as possible. For this purpose, an analysis step can be carried out before the step of the removal, in which analysis step the power and torque flows in the planetary transmission with the second number of planetary gear sets are analyzed in conjunction with the gears which can be realized by way of said planetary transmission. In addition, a satisfactory shifting capability of the transmission has to be ensured here. This means that only one or two shifting elements have to have their state changed in order to change adjoining gears. The planetary transmission can subsequently be hybridized, that is to say one or more electric motors can be integrated. All the frictionally locking shifting elements can then also preferably be replaced by positively locking shifting elements. Therefore, a method is provided, by means of which further planetary transmissions which can be hybridized can be produced on the basis of an existing planetary transmission in a simple way. Numerous transmission variants can therefore be generated with low development outlay.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
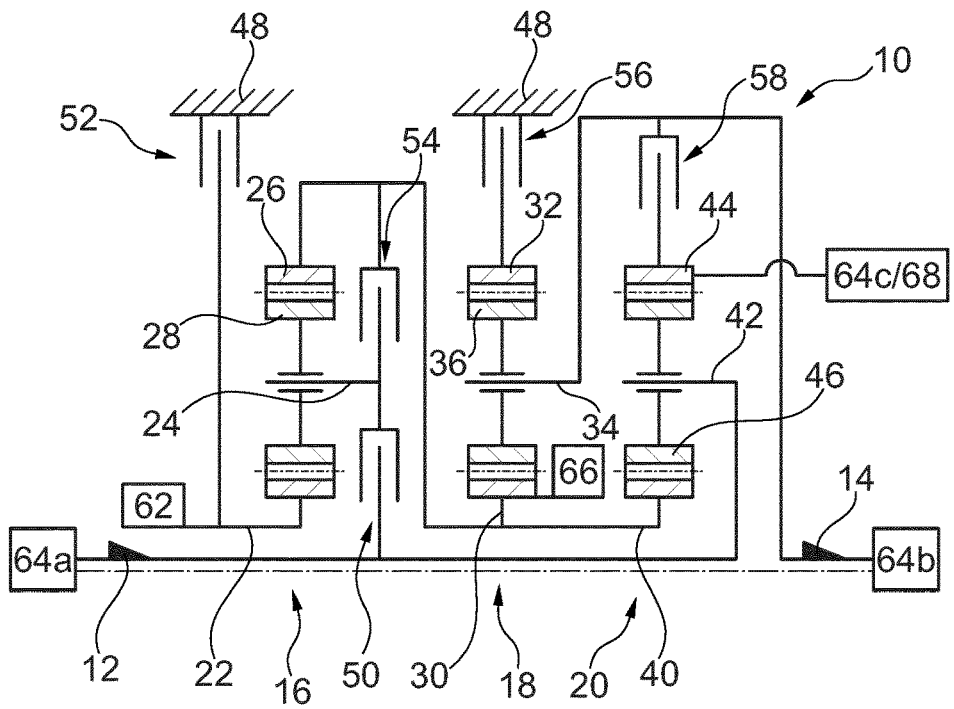
FIG. 1 diagrammatically shows a first embodiment of a 6-speed planetary transmission according to the invention.

FIG. 1 shows a 6-speed planetary transmission 10. It comprises a transmission input shaft 12 and a transmission output shaft 14.

The transmission input shaft 12 and the transmission output shaft 14 can be coupled via a first planetary gear set 16, a second planetary gear set 18 and a third planetary gear set 20.

The first planetary gear set 16 comprises a first sun gear 22, a first planetary carrier 24, a first internal gear 26 and a first planetary gear 28.

The second planetary gear set 18 comprises a second sun gear 30, a second internal gear 32, a second planetary carrier 34 and a second planetary gear 36.

The third planetary gear set 20 comprises a third sun gear 40, a third planetary carrier 42, a third internal gear 44 and a third planetary gear 46.

For reasons of clarity, in each case only a first planetary gear 28, a second planetary gear 36 or a third planetary gear 46 is shown in the planetary gear sets 16, 18, 20. It goes without saying that the planetary gear sets 16, 18, 20 can also comprise a plurality of planetary gears.

The planetary gear sets 16, 18, 20 are arranged in a transmission housing 48.

The transmission input shaft 12 can be coupled via a first shifting element 50 to the first planetary carrier 24.

Moreover, the first sun gear 22 can be coupled via a second shifting element 52 to the transmission housing 48.

Furthermore, the first planetary carrier 24 can be coupled via a third shifting element 54 to the first internal gear 26.

Here, the first internal gear 26, the second sun gear 30 and the third sun gear 40 are connected fixedly so as to rotate together. Therefore, the second sun gear 30 and the third sun gear 40 form what is known as a double sun.

Furthermore, the second internal gear 32 can be coupled via a fourth shifting element 56 to the transmission housing 48.

The transmission output shaft 14 is connected fixedly to the second planetary carrier 34 so as to rotate with it.

Figure 2:
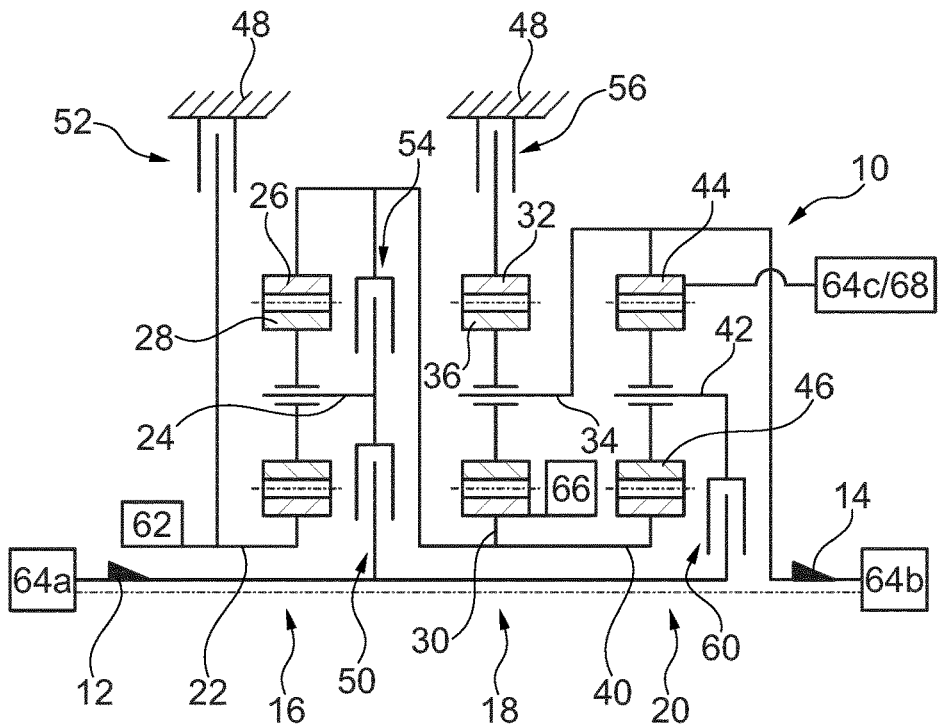
FIG. 2 diagrammatically shows a second embodiment of a 6-speed planetary transmission according to the invention.

The abovementioned structure is common to the two embodiments of the 6-speed planetary transmission 10 which are shown in FIGS. 1 and 2.

In the embodiment which is shown in FIG. 1, the transmission input shaft 12 is additionally connected fixedly to the third planetary carrier 42 so as to rotate with it.

Moreover, the transmission output shaft 14 can be coupled via a fifth shifting element 58 to the third internal gear 44 in this embodiment.

In the embodiment which is shown in FIG. 2, the transmission output shaft 14 is connected fixedly to the third internal gear 44 so as to rotate with it.

Furthermore, the transmission input shaft 12 can be coupled via a sixth shifting element 60 to the third planetary carrier 42 in the embodiment which is shown in FIG. 2.

Figure 3:
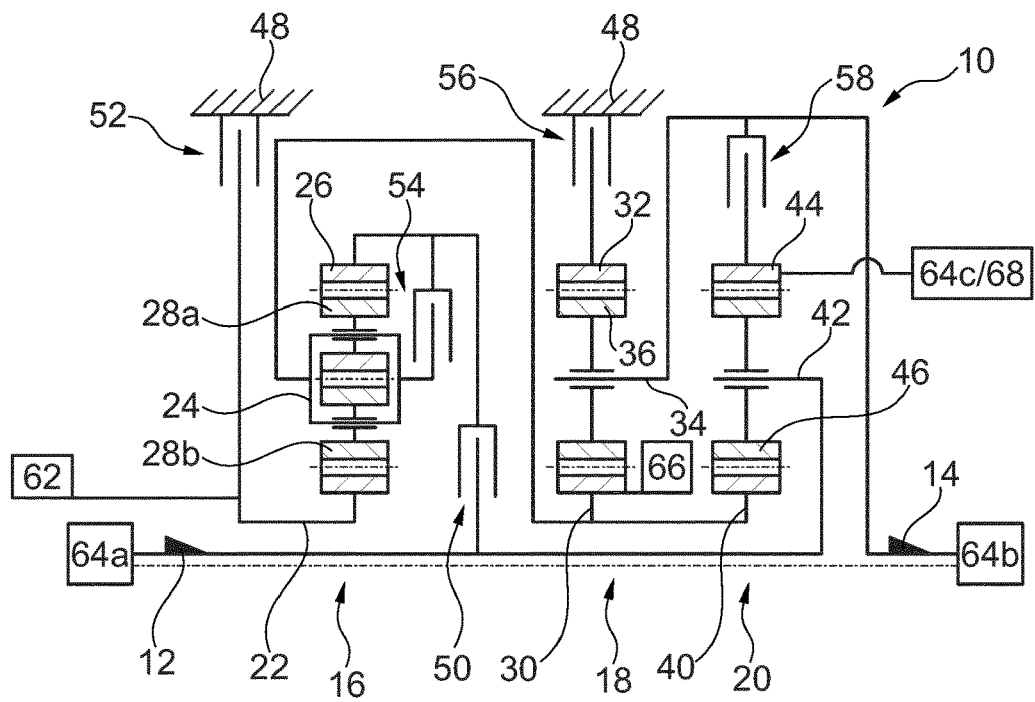
FIG. 3 diagrammatically shows a third embodiment of a 6-speed planetary transmission according to the invention.

The embodiment which is shown in FIG. 3 differs from the 6-speed planetary transmission 10 which is shown in FIG. 1 in that two planetary gears 28a, 28b are arranged in the radial direction.

The first planetary gear set 16 therefore comprises an outer first planetary gear 28a and an inner first planetary gear 28b.

Here, the outer first planetary gear 28a interacts with the first internal gear 26, the inner first planetary gear 28b interacts with the first sun gear 22, and the outer first planetary gear 28a interacts with the inner first planetary gear 28b.

Moreover, in the embodiment according to FIG. 3, the first shifting element 50 acts between the first internal gear 26 and the transmission input shaft 12 instead of between the transmission input shaft 12 and the first planetary carrier 24, as in the embodiments according to FIGS. 1 and 2.

In addition, instead of the first internal gear 26, the first planetary carrier 24 is connected fixedly to the second sun gear 30 and the third sun gear 40 so as to rotate with them in the embodiment which is shown in FIG. 3.

Figure 4:
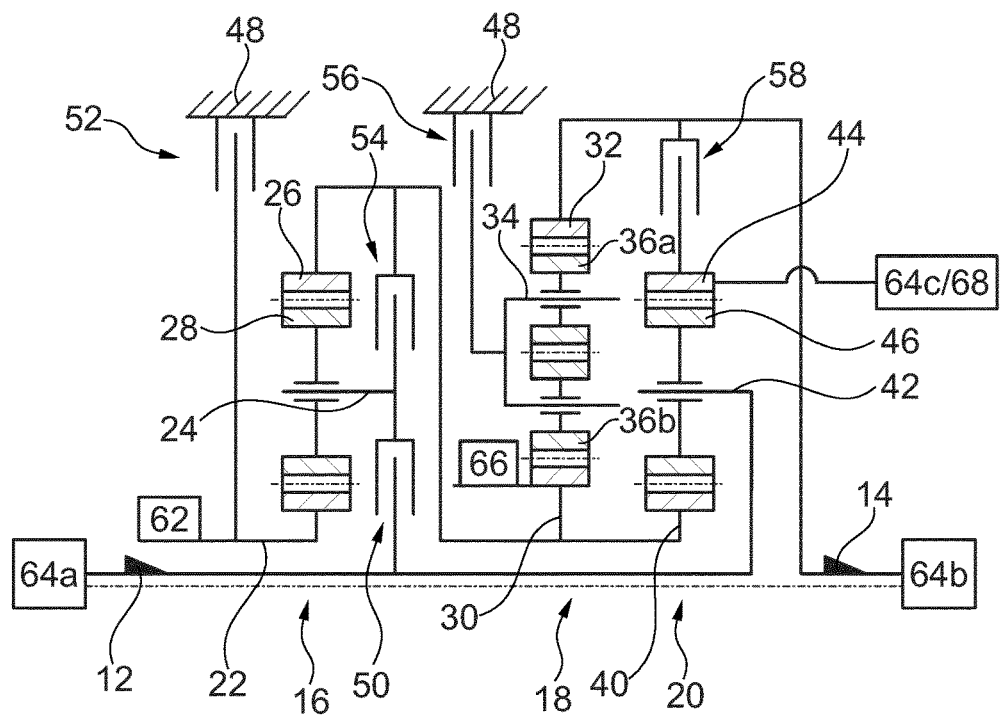
FIG. 4 diagrammatically shows a fourth embodiment of a 6-speed planetary transmission according to the invention.

In contrast to the embodiment which is shown in FIG. 1, the embodiment according to FIG. 4 comprises two second planetary gears 36a, 36b.

As a result, the second planetary gear set 18 comprises an outer second planetary gear 36a and an inner second planetary gear 36b, the outer second planetary gear 36a interacting with the second internal gear 32, the inner second planetary gear 36b interacting with the second sun gear 30, and the outer second planetary gear 36*a* interacting with the inner second planetary gear 36*b*.

In contrast to the embodiment according to FIG. 1, in addition, instead of the second internal gear 32, the second planetary carrier 24 can be coupled via the fourth shifting element 56 to the transmission housing 48.

The second planetary carrier 34 is also not connected fixedly to the transmission output shaft 14 so as to rotate with it, but rather the second internal gear 32 is connected to said transmission output shaft 14.

Figures 5, 6:
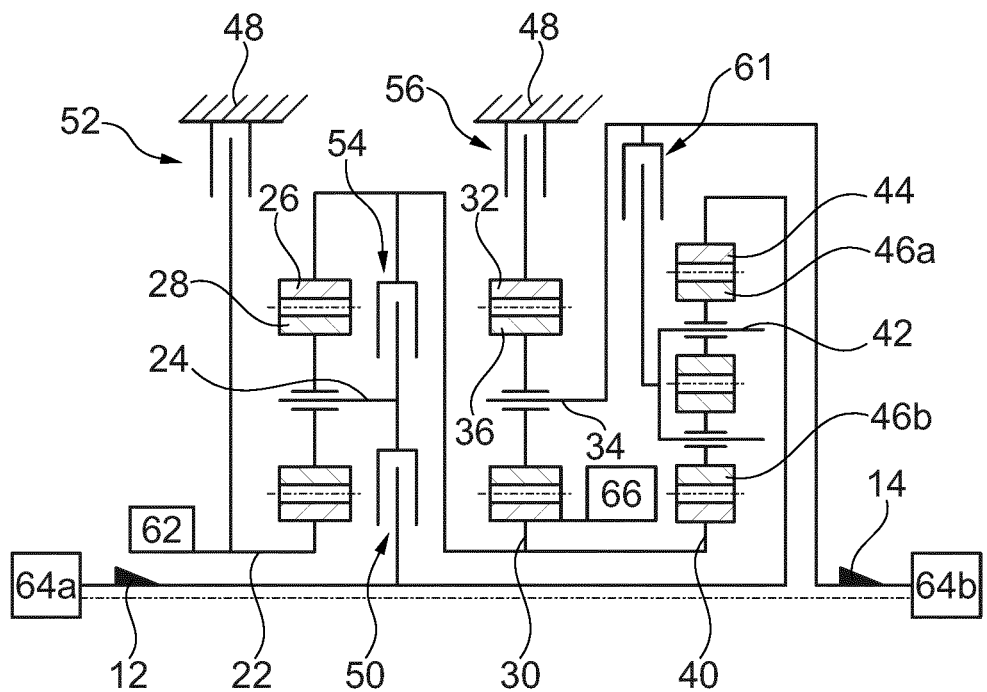
FIG. 5 diagrammatically shows a fifth embodiment of a 6-speed planetary transmission according to the invention.
FIG. 6 shows a shifting pattern which belongs to the 6-speed planetary transmissions which are shown in FIGS. 1 to 5.

FIG. 5 shows a further embodiment, in which the transmission input shaft 12 is connected fixedly to the third internal gear 44 so as to rotate with it. The differences with respect to the embodiment which is shown in FIG. 1 will be described again.

Here, the third planetary carrier 42 can be coupled via a seventh shifting element 61 to the transmission output shaft 14.

Furthermore, the third planetary gear set 20 then comprises two third planetary gears 46*a*, 46*b* which are arranged radially next to one another.

Here, the outer third planetary gear 46*a* interacts with the third internal gear 44, the inner third planetary gear 46*b* interacts with the third sun gear 40, and the outer third planetary gear 46*a* interacts with the inner third planetary gear 46*b*.

Those shifting elements 50, 54, 58, 60, 61 which act between rotatable components of the 6-speed planetary transmission 10 can be called clutches.

The shifting elements 52, 56 act between the transmission housing 48 and rotatable transmission components. They can be called brakes.

In FIGS. 1 to 5, the shifting elements 50-61 are positively locking shifting elements.

The 6-speed planetary transmission 10 which is shown in FIGS. 1 to 5 can be hybridized.

Here, a first electric motor 62 is coupled to the first sun gear 22.

An additional, second electric motor 64*a* can be coupled to the transmission input shaft 12. As an alternative, the second electric motor 64*b* can be operatively connected to the transmission output shaft 14. It is a further alternative to couple the second electric motor 64*c* to the third internal gear 44.

FIGS. 1 to 4 in each case show three second electric motors 64*a*-64*c*. These represent alternatives, however. The 6-speed planetary transmission 10 therefore always comprises only a single second electric motor 64*a*-64*c*.

In the embodiment according to FIG. 5, the electric motors 64*a* and 64*c* have an identical action. The electric motor 64*c* is therefore not shown.

In the embodiment which is shown in FIG. 5, a motor which corresponds to the electric motor 64*c* can be attached, however, to the planetary carrier 42 of the third planetary gear set 20. A motor of this type is not shown in the figure.

As an alternative to the first electric motor 62 and to the second electric motor 64*a*-64*c*, a third electric motor 66 can be coupled to the second sun gear 30.

In addition, a fourth electric motor 68 can be coupled to the third internal gear 44. Here, the fourth electric motor 68 corresponds to the second electric motor 64*c* which is also coupled to the third internal gear 44.

In the embodiment which is shown in FIG. 5, the fourth electric motor 68 therefore corresponds to the electric motor 64*a*. The electric motor 68 is therefore not shown.

The electric motor or motors 62-68 can be used to realize a reverse gear of the 6-speed planetary transmission 10.

Moreover, one or more of the electric motors 62-68 can be used as synchronizing elements.

FIG. 6 shows a shifting pattern which belongs to the 6-speed planetary transmission 10. To this end, the shifting elements 52-61 are indicated in the column header. Six shiftable gears A to F are noted in the row header. The table which is defined in this way then specifies which shifting elements are closed in which gear.

In gear A, the shifting elements 50, 54 and 56 are closed. The remaining shifting elements 52, 58, 60, 61 are open.

In gear B, the shifting elements 50, 52 and 56 are closed. The shifting elements 54, 58, 60, 61 are open.

Gear C provides that the shifting elements 50, 56 and 58, 60 or 61 are closed. The shifting elements 54 and 52 are open.

In gear D, the shifting elements 50, 52 and 58, 60 or 61 are closed. The shifting elements 54 and 56 are open.

In gear E, the shifting elements 52 and 56 are open, but the shifting elements 50, 54 and 58, 60 or 61 are closed.

In gear F, the shifting elements 52, 54 and 58, 60 or 61 are closed, and the shifting elements 50 and 56 are open.

It can therefore be seen from FIG. 6 that always only the shifting state of two of the shifting elements 50-61 has to be changed for changing between adjoining gears.

The shifting elements 50-61 can be shifted in an automated manner, with the result that the 6-speed planetary transmission 10 is a transmission which can be shifted in an automated manner.

The 6-speed planetary transmission 10 can be derived from a planetary transmission 100 with four planetary gear sets. A planetary transmission of this type is known, for example, from DE 10 2009 025 609 A1 (see FIG. 1 thereof).

Figure 7:
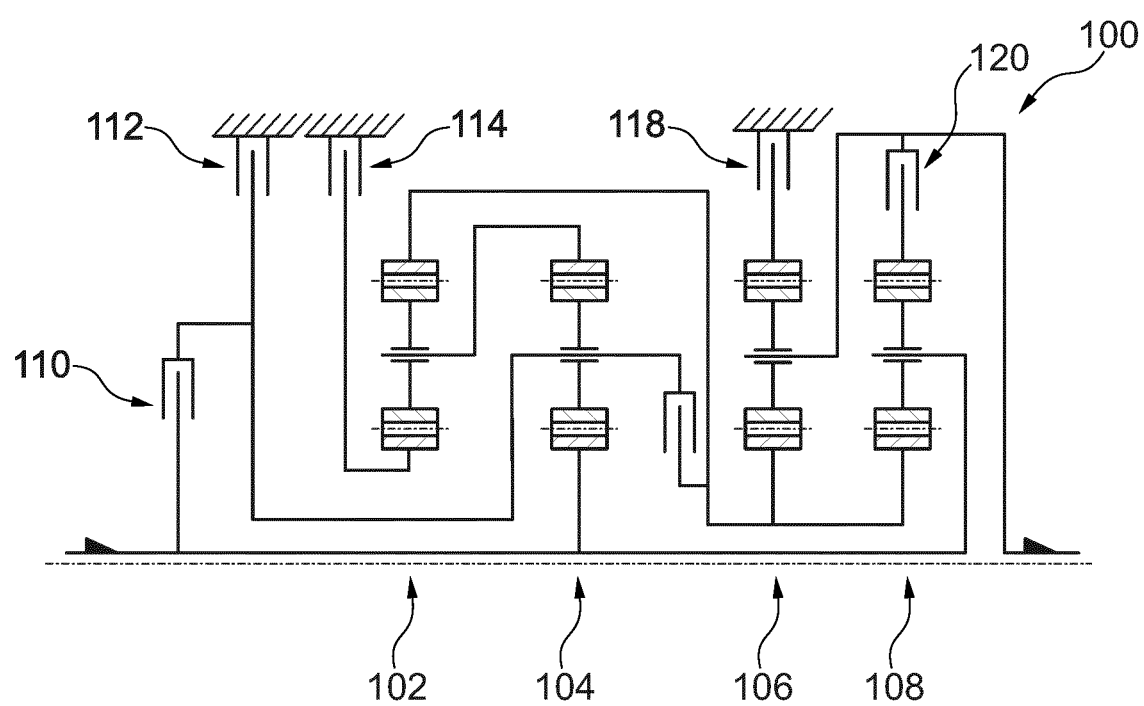
FIG. 7 diagrammatically shows a known 9-speed planetary transmission, from which a 6-speed planetary transmission according to the invention can be derived.

In FIG. 7, the planetary transmission 100 is a 9-gear transmission and comprises a first planetary gear set 102, a second planetary gear set 104, a third planetary gear set 106 and a fourth planetary gear set 108.

Moreover, the planetary transmission 100 comprises a first shifting element 110, a second shifting element 112, a third shifting element 114, a fourth shifting element 116, a fifth shifting element 118 and a sixth shifting element 120. The nine gears can be shifted by way of the actuation of said shifting elements 110-120.

In order then, for example, to derive the 6-speed planetary transmission 10 according to FIG. 1 from the planetary transmission 100 of FIG. 7, the second planetary gear set 104 is removed from the planetary transmission 100 in the example which is shown.

As a consequence, the shifting element 112 can also be dispensed with. The shifting elements 110 and 116 are displaced within the transmission structure or are replaced by shifting elements with an identical action. Therefore, the shifting element 110 corresponds to the shifting element 50, and the shifting element 116 corresponds to the shifting element 54.

The derivation of the 6-speed planetary transmission 10 which is shown in FIGS. 2 to 5 takes place in an analogous manner.

The 6-speed planetary transmission 10 is of more compact construction in comparison with the planetary transmission 100, and provides more installation space for the integration of electric motors 62-68.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A 6-speed planetary transmission for a motor vehicle, comprising:
a transmission input shaft;
a transmission output shaft;
a first planetary gear set which comprises a first sun gear, a first planetary carrier, a first internal gear and at least one first planetary gear;
a second planetary gear set which comprises a second sun gear, a second planetary carrier, a second internal gear and at least one second planetary gear; and
a third planetary gear set which comprises a third sun gear, a third planetary carrier, a third internal gear and at least one third planetary gear, wherein
the transmission input shaft is coupleable via a first shifting element to the first planetary carrier or the first internal gear,
the first sun gear is coupleable via a second shifting element to a transmission housing,
the first planetary carrier is coupleable via a third shifting element to the first internal gear,
the first internal gear or the first planetary carrier, the second sun gear and the third sun gear are connected fixedly so as to rotate together,
the second internal gear or the second planetary carrier is coupleable via a fourth shifting element to the transmission housing, and
the transmission output shaft is connected fixedly to the second planetary carrier or the second internal gear so as to rotate together,
wherein
the first planetary gear set comprises an outer first planetary gear and an inner first planetary gear,
the outer first planetary gear interacts with the first internal gear,
the inner first planetary gear interacts with the first sun gear, and
the outer first planetary gear interacts with the inner first planetary gear.

2. The 6-speed planetary transmission as claimed in claim 1, wherein
the transmission input shaft is connected fixedly to the third planetary carrier so as to rotate together.

3. The 6-speed planetary transmission as claimed in claim 1, wherein
the transmission output shaft is coupleable via a fifth shifting element to the third internal gear.

4. The 6-speed planetary transmission as claimed in claim 1, wherein at least one of the shifting elements is a positively locking shifting element.

5. The 6-speed planetary transmission as claimed in claim 1, wherein all of the shifting elements are positively locking shifting elements.

6. The 6-speed planetary transmission as claimed in claim 1, further comprising:
a first electric motor coupled to the first sun gear.

7. The 6-speed planetary transmission as claimed in claim 6, further comprising:
a second electric motor coupled to the transmission input shaft, the transmission output shaft or the third internal gear.

8. The 6-speed planetary transmission as claimed in claim 1, further comprising:
a third electric motor coupled to the second sun gear.

9. The 6-speed planetary transmission as claimed in claim 1, further comprising:
a third electric motor coupled to the second sun gear, and
a fourth electric motor coupled to the third internal gear.

* * * * *